United States Patent Office 3,425,991
Patented Feb. 4, 1969

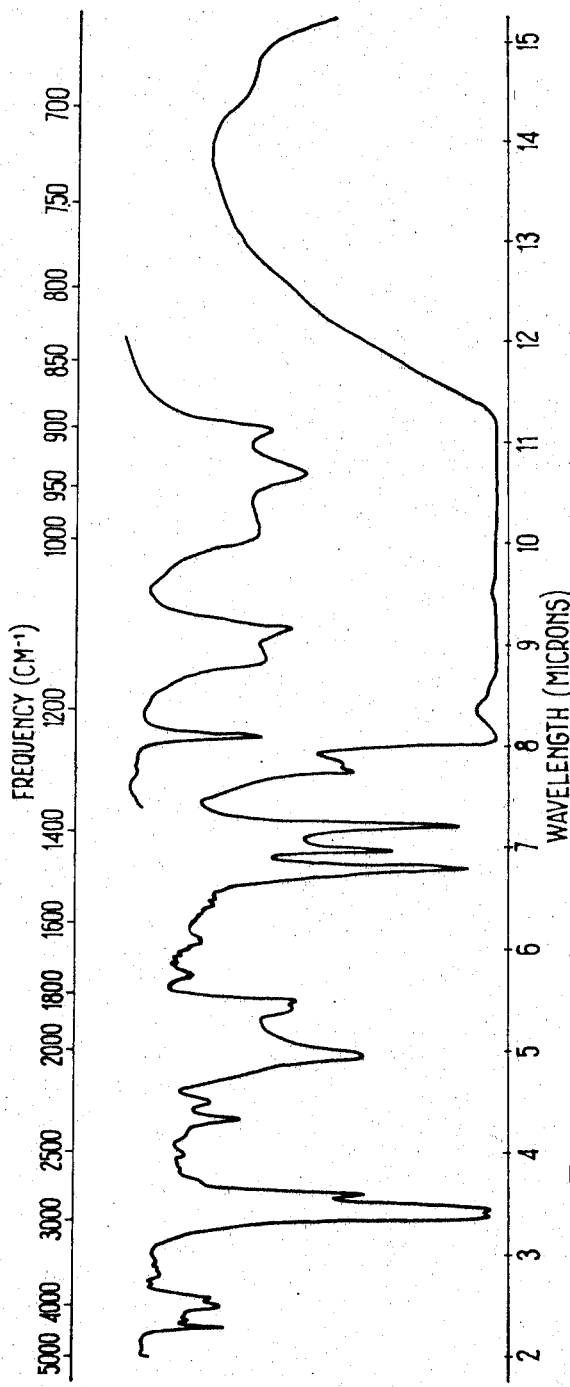

3,425,991
THERMALLY STABLE FORMALDEHYDE HIGH POLYMERS AND PROCESS FOR THEIR PREPARATION
Luigi Mortillaro and Mario Russo, Padova, Italy, and Silvio Bezzi, deceased, late of Padova, Italy, by Ladislava Viller, heir, Padova, Italy, assignors to Montecatini Edison S.p.A., Milan, Italy
Filed Apr. 12, 1965, Ser. No. 448,578
Claims priority, application Italy, Apr. 13, 1964, 8,099/64; Dec. 11, 1964, 26,452/64
U.S. Cl. 260—67                                                   6 Claims
Int. Cl. C08g *1/02, 1/22*

ABSTRACT OF THE DISCLOSURE

Preparation of thermally stable mixture of polyoxymethylene glycols, monoethers and diethers, having essentially orthorhombic crystalline structure, by reacting an aqueous suspension of polyoxymethylene with formaldehyde in the presence of a strong inorganic or organic acid at from 0°–60° C., optionally in the presence of either an aliphatic alcohol having 1–5 carbon atoms, or a neutral salt of an inorganic base and a strong acid, or both. Subsequent treatment of the solid product with $Na_2CO_3$ at 100°–220° C. produces polyoxymethylene diethers.

---

This invention is directed to a process for preparing thermally stable formaldehyde high polymers and more particularly, polyoxymethylene-diethers from aqueous formaldehyde solutions.

An object of the present invention is polymeric mixtures comprising polyoxymethylene-diethers having essentially orthorhombic structure.

From U.S. patent applications Ser. No. 168,220, filed on Jan. 23, 1962, now abandoned, and Ser. No. 342,334, filed on Jan. 30, 1964, it is known that the polymerization of formaldehyde from aqueous solutions at low temperature (<60° C.) is strongly catalyzed by soluble salts of organic or inorganic acids with alkali and alkaline earth metals, at an alkaline pH (>7).

It has now been found that the polymerization of formaldehyde from aqueous solutions is also catalyzed by one or more acids selected from the group consisting of strong organic and inorganic acids, having a pKa <2 for each hydrogen, such as $H_2SO_4$, HCl, $HClO_4$, and paratoluenesulfonic acid. In the presence of the strong acid it is possible to reach stationary conditions at relatively low temperatures (lower than 60° C.), regarding both the polymer production per hour and the average molecular weight of the polymer, which conditions remain indefinitely constant with time.

Table 1 shows the catalytic effect of various acids, as compared with a test run carried out in the absence of acids and at pH 10.4±0.2, all other operating conditions being the same.

TABLE 1

[Specific influence of some strong acids on the average molecular weight on the polymer under stationary conditions]

T=35° C.; Kinetics=1.4 (the term "kinetic" means the total polymerization rate expressed as g. of aldehyde withdrawn from the liquid phase per hours per 100 g. of pre-existing solid polymer)

| Acid | Acid concentration, percent by weight of the solution | $\eta$ Red of the polymer obtained |
|---|---|---|
| Absent (pH 10.4±0.2) | | 0.28–0.30 |
| $H_2SO_4$ | 10.68 | 0.65 |
| $HClO_4$ | 9.24 | 0.56 |
| HCl | 6.00 | 0.59 |
| $p\text{-}CH_3C_6H_4SO_3H$ | 15.69 | 0.52 |

It is shown from the table that the use of acids makes it possible to obtain higher average molecular weights (expressed as reduced viscosity of the acetyl derivatives, as described hereinabove).

It has also been found that the catalytic effect of the acids increases by increasing their concentration in the reaction liquid phase up to a maximum value, above which each increase in the acid concentration causes a decrease in its catalytic action. This fact is shown by the higher or lower average molecular weight of the polymer obtained under stationary conditions. There is therefore an optimum range of concentration variable depending on the acid used, below and above which the catalytic activity decreases, as appears, for instance, from Tables 2, 3 and 4 showing the use of sulfuric, perchloric and hydrochloric acid, respectively.

TABLE 2

[Influence of the sulfuric acid concentration on the average molecular weight of the polymer obtained under stationary conditions]

T=35° C.; Kinetics=1.4

| $H_2SO_4$ concentration in the liquid phase, percent by weight: | $\eta_{red}$ of the polymer obtained |
|---|---|
| 1.94 | <0.1 |
| 4.59 | 0.15 |
| 6.50 | 0.28 |
| 8.58 | 0.62 |
| 10.68 | 0.65 |
| 12.90 | 0.69 |
| 16.10 | 0.60 |
| 18.23 | 0.58 |
| 21.30 | 0.51 |
| 29.60 | 0.24 |
| 42.30 | <0.1 |

TABLE 3

[Influence of the perchloric acid concentration on the average molecular weight of the polyoxymethylene obtained under stationary conditions]

T=35° C.; Kinetics=1.4

| $HClO_4$ concentration in the liquid phase, percent by weight: | $\eta_{red}$ of the polymer obtained |
|---|---|
| 6.49 | 0.37 |
| 9.24 | 0.56 |
| 12.12 | 0.57 |
| 17.02 | 0.50 |
| 22.04 | 0.35 |

TABLE 4

[Influence of the hydrochloric acid concentration on the average molecular weight of the polyoxymethylene obtained under stationary conditions]

| HCl concentration in the liquid phase, percent by weight: | |
|---|---|
| 2.27 | 0.27 |
| 6 | 0.59 |
| 8 | 0.56 |
| 13.2 | 0.16 |

It has been found that the polymers obtained by polymerization of formaldehyde from aqueous solutions in the presence of any of the strong acids, such as $HClO_4$, HCl, $H_2SO_4$ and paratoluenesulfonic acid, have an unexpected thermal stability, higher than that of the normal polyoxymethylene glycols of the same average molecular weight. This high thermal stability depends on the presence in the solid polymer, in addition to polyoxymethylene glycols, of polyoxymethylene monoethers and of polyoxymethylene diethers which diethers, are known to be thermally stable, in the absence of oxygen, up to about 270° C. (W. Kern and H. Cherdron, Makromol. Chem. 40, 101–117, 1960).

The etherification occuring under these conditions is due to methanol present in the commercial aqueous formaldehyde solutions and to methanol formed in the reaction medium by dismutation of formaldehyde and is catalyzed by the acids present in the polymerization system. The outside addition of an aliphatic alcohol to the system allows for a considerable increase in the percentage of polyoxymethylene diethers and of polyoxymethylene monoethers, present in the polymer obtained under stationary conditions, together with polyoxymethylene glycols. The alcohols which can be used according to the present invention are preferably linear alcohols having 1–5 carbon atoms, namely methanol, ethanol, propanol, butanol and amyl alcohol. The best results are obtained using methanol.

The dietherified fractions which, without outer addition alcohols amounts to 10–15% of the total polymer, in this case reaches values of 55% of the total polymer as appears from Table 5.

TABLE 5

[Percentage of polyoxymethylene diethers present in the polymers obtained under stationary conditions in tests carried out with and without addition of methanol from outside]

| Acid present in the liquid phase | Acid concentration in the liquid phase, percent by weight | Methanol added from outside | Methanol concentration in the liquid phase, percent by weight | Percent of polyoxymethylene diethers in the polymer obtained under stationary conditions |
|---|---|---|---|---|
| $H_2SO_4$ | 10.68 | Not | [1] ≃1.5 | 10–15 |
| $H_2SO_4$ | 11 | Yes | ≃7 | ~50 |
| HCl | 8 | Not | [1] ≃1.5 | 10–15 |
| HCl | 6 | Yes | ≃8 | 50–55 |

[1] Methanol present in the commercial aqueous formaldehyde solution and formed by dismutation of the aldehyde.

It has also been found that if a neutral salt of an inorganic base and of one of the aforementioned acids is added to the acid/alcohol system, a further increase in the percentage of polyoxymethylene diethers present in the polymer is obtained, as appears from Table 6 in which the characteristics and results of two experiments (one carried out in the presence of HCl and $CH_3OH$ and the other in the presence of HCl, $CH_3OC$ and NaCl) are reported.

TABLE 6

[Percentage of polyexymethylene diethers present in the polymers obtained with HCl/$CH_3OH$ systems, with and without addition of NaCl]

| HCl concentration in the liquid phase, percent by weight | $CH_3OH$ concentration in the liquid phase, percent by weight | NaCl concentration in the liquid phase, percent by weight | Percent of polyoxymethylene diethers in the polymer obtained under stationary conditions |
|---|---|---|---|
| 4 | 5 | 0 | 25–35 |
| 5.4 | 5.4 | 8.3 | 55–75 |

The present invention consists of suspending solid polyoxymethylenes however obtained, in aqueous formaldehyde solutions having a $CH_2O$— concentration comprised between the equilibrium concentration and the stability limit of the system, at temperatures comprised between 0° and 60° C., preferably between 20° and 40° C. in the presence of one or more organic or inorganic strong acids having pKa <2 for each hydrogen, whose concentration in the solution is comprised between 0.5% and 31% by weight of the solution, and in the presence of an aliphatic alcohol (either present in the $CH_2O$ solution or added from outside) whose concentration in the solution is lower than 25% by weight and of a salt (having neutral reaction in water) of an inorganic base with one of the aforementioned acids having pKa <2 for each hydrogen, whose concentration in the solution is lower than or equal to the saturation concentration in the system.

To the thus obtained suspension, the reactants initially present in the solution are added batchwise or continuously in order to reintegrate those consumed during the process and to keep the composition of the liquid phase constant with time and the liquid/solid ratio.

A process of this type can be performed either in a single reactor or in various reactors, by operating e.g., in cascades. The suitable concentrations of the reaction medium and of the feeds for each reactor or for each reaction zone of the same reactor. The alcohols and salts used must have at least limited solubility in the reaction medium.

All the polymers obtained by this invention have a crystallinity of 100% (measured by X-ray examination) and have an essentially orthorhombic crystalline form.

Although it is not intended that we be limited by any mechanism of the reaction which occurs according to the claimed process, but instead only to describe the practical realization of a process capable of giving useful substances, we deem that under the described conditions the following phenomena take place:

Crystallization of polyoxymethylene glycols and polyoxymethylene monoethers and polyoxymethylene diethers of which the solution is supersaturated.

Increase of the molecular weight of polyoxymethylene glycols and of polyoxymethylene monoethers crystallized from the solution and of the polyoxymethylene glycols initially present as the solid phase, by topochemical reaction with formaldehyde present in the solution.

Etherification of the terminal hydroxyls of the polyoxymethylenic chains by reaction with the aliphatic alcohol present in the solution.

Under the operating conditions according to the present invention, the three aforementioned reactions have such relative rates that with time the solid reaches a stationary composition, as regards the ratios between the amounts of polyoxymethylenglycols, polyoxymethylene - monoethers and polyoxymethylenediethers, and as regards the average molecular weight and the crystalline structure.

This makes it possible to operate according to a process in which the polymerization reaction and the blocking reaction of the terminal hydroxyls of the chains take place simultaneously with a high molecular weight polyoxymethylene being obtained.

This invention differs completely from what has been previously reported in the literature. It is known, e.g., that by adding conc. $H_2SO_4$ to aqueous formaldehyde solutions, the separation of solid products called α and β polyoxymethylenes takes place (F. Auerbach and H. Barschall: "Studien uber Formaldehyde—Die Festen Polymeren des Formaldehyde," Berlin, Julius Springer (1907), pp. 10–11 and 20–26).

However, it is known (J. F. Walker: "Formaldehyde," ACS Monograph No. 159 (1964), pp. 158–163) that α and β polyoxymethylenes are polymers with a low degree of polymerization (100–300) and therefore have no commercial value, while the polymers obtained by this invention have a high average degree of polymerization (>500) and can be advantageously used as thermoplastic materials.

It should be added that α and β polyoxymethylenes have the same crystalline structure as paraformaldehyde, namely the well known hexagonal crystalline structure which differs completely from the orthorhombic crystalline structure of the polymers obtained by our process. However, the density of the two polymers is also different: while a 100% crystalline hexagonal polyoxymethylene has a density of 1.491 g./cm.$^3$, a 100% crystalline orthorhombic polyoxymethylene has a density of 1.532 g./cm.$^3$ (G. Carazzolo and G. Putti, Chimica e l'Industria, 45, 771–776, 1963).

The process and the products of our invention are also completely different from those of Walker (U.S. No. 2,369,504) and Smithson (U.S. No. 2,704,765), whose process for the distillation of aqueous formaldehyde solution at 50–100° C. in the presence of minimum amounts (<0.3%) of nonvolatile acids (Walker) and for stripping vapours rich of formaldehyde with non-solvent liquids (with exclusion of water) in the presence of $H_2SO_4$, lead to the preparation of low molecular weight polymers (paraformaldehyde) in the hexagonal crystalline form.

The only known process leading to the preparation of polyoxymethylenes having a high polymerization degree (>500) from aqueous or alcoholic formaldehyde solutions in an acid medium is described by Brown (U.S. Patents No. 3,000,860 and 3,000,861) who prepares high molecular weight polyoxymethylenes from aqueous or alcoholic formaldehyde solutions with a two-stage process, in the presence of acids having pKa >2 per each hydrogen, at temperatures higher than 60° C. under atmospheric pressure. Our operating conditions are therefore completely different from those of Brown and our reaction system therefore has a behavior completely different from that of Brown: this is demonstrated by the fact that if our process is carried out at the temperatures used by Brown (>60° C.) or in the presence of the acids used by Brown (pKa >2) the catalysis does not proceed at all and polyoxymethylenes having a very low polymerization degree (<300) are produced.

Before this invention, only obtaining polyoxymethylene-diethers having a very low molecular weight and no commercial value from aqueous formaldehyde solutions was known (J. F. Walker "Formaldehyde," ACS Monograph No. 159 (1964), pp. 164–173), while high molecular weight polyoxymethylenes were obtained only from substantially anhydrous media and with high amounts of etherifying agent (Italian Patents No. 682,325 and 624,568). All the polyoxymethylene-diethers previously known had a crystalline structure belonging to the hexagonal system.

In order to more fully explain our invention some examples are reported which are not intended to limit it. During the experiments described in the examples, some samples were periodically withdrawn in order to determine the crystalline structure, the molecular weight of the solid, and the percent proportion of polyoxymethylene-diethers of the solid. The thermal stability of the dietherified product was then determined. For these determinations each sample was washed with distilled water until neutrality of the washing waters was shown, and then with a benzene amount corresponding to the weight of the samples. The product was then dried for 12 hours at 43° C. under 15 mm. Hg of pressure.

The crystalline structure was determined by X-ray examination according to the method of Carazzolo and Putti, as reported in the literature (G. Carazzolo and C. Putti, Chimica e Industria, 45, 771–776, 1963).

The determination of the molecular weight of the polymer was carried out by measuring the reduced viscosity at 150° C. in dimethylformamide with a concentration of 0.5% (g./cc.). To this end, the polymer was treated with acetic anhydride (10 parts by weight per 1 part of polymer) free of acetic acid in a vial sealed under vacuum. The vial was immersed into an oil bath heated to 170° C. and kept therein until the polymer dissolved. With agitation 3 to 5 minutes are required. After cooling of the vial the polymer precipitates with a yield higher than 90%.

In order to eliminate the non-dietherified polymeric fraction we can operate in various ways. Thus one part by weight of polymer was suspended in 20 parts of 1 M aqueous solution of $Na_2CO_3$, and the suspension was heated to 100° C. for 1 hour while agitating. In this manner, prevailingly polyoxymethylene glycols are eliminated. After cooling the polymer is recovered by filtration washing with distilled $H_2O$ until neutrality of the washing water, and dried for 12 hours at 43° C. under a pressure of 15 mm. Hg. The fraction recovered after this treatment by heating to 220° C. under vacuum for 1 hour shows a further weight loss in respect of the initial weight. By further heating to the same temperature the residual polymer appears to be stable indefinitely and its thermal stability was evaluated by measuring the weight loss of the polymer by heating to 220° C. for 120 minutes in a glass vial kept under vacuum (residual pressure of 10 mm. Hg) and is expressed as $K_d^{200}$ (percent weight loss per minute, referred to the initial weight). The $K_d^{200}$ of the dietherified product obtained as described above is lower than 0.1.

Another method for eliminating the non-dietherified portion consists of heating the polymer mixed with 2% of sodium carbonate to 220° C. in a glass vial kept under vacuum. The amount of sodium carbonate mixed with the polymer is more than sufficient to neutralize the acid traces present, if there are any. On the portion recovered after this treatment, consisting of polyoxymethylene-diethers, the stability is determined as reported above. In this case the resulting polymeric fraction also has a $K_d^{200}$ lower than 0.1.

The polymeric fraction having a $K_d^{200} < 0.1$ was subjected to infrared examination, the infrared absorption spectrum of a polymer film shows the almost complete disappearance of the absorption band at 2.9 characteristic of the hydroxyl groups of polyoxymethylene glycols, as it appears from the accompanying picture, spectrum B.

Spectrum A was obtained with a film having a lower thickness in order to better show the spectrum zone between 3 and 12. The amounts reported, unless the contrary is explicitly specified, are by weight.

Example 1 is reported as a comparison in order to show the improvement obtained in the molecular weight and/or in the thermal stability of polyoxymethylenes obtained in the other examples.

EXAMPLE 1

2 kg. of a suspension consisting of 548 g. of polyoxymethylene and 1.452 g. of an aqueous solution having the following composition:

| | Percent by weight |
|---|---|
| Water | 70 |
| Formaldehyde | 30 | are introduced into a 2-liter reactor provided with an agitator and immersed in a thermostatic bath at 35° C.

The starting polyoxymethylene used in this experiment has the following characteristics:

| | |
|---|---|
| $\eta_{red}$ | 0.59 |
| Crystalline orthorhombic form, measured by X-ray examination _____percent__ | 80 |
| Residual fraction resulting from the thermal treatment at 220° C. with $Na_2CO_3$ under vacuum ____ | 0 |

To the suspension having the above composition the following ingredients are added every hour, after having withdrawn the same amount by weight of suspension:

| | G. |
|---|---|
| 50% (by weight) $CH_2O$ solution | 28.0 |
| 10 N NaOH solution | 1.2 |

The amount of NaOH is sufficient to maintain the pH of the suspension at about 10.4 for the entire reaction time.

From the reactor 686 g. of suspension are discharged every 24 hours. From this suspension, after filtration, washing and drying, about 188 g. of polyoxymethylene corresponding to 1.4 g. of polymer per hour per 100 g. of pre-existing solid polymer are obtained. The experiment is stopped after 31 days. The amount of polymer obtained every day is practically constant. From the 14th day onwards the polymer has almost constant characteristics, more particularly:

$\eta_{red}$ ------------------------------------ 0.28–0.30
Crystalline orthorhombic form _____percent__ 65–75
Residual fraction resulting from the thermal treatment at 220° C. under vacuum with $Na_2CO_3$ _____ 0

EXAMPLE 2

3 kg. of a suspension consisting of 304.8 g. of polyoxymethylene and 1,695.2 g. of an aqueous solution having the following composition:

| | Percent |
|---|---|
| $H_2SO_4$ | 1.94 |
| Formaldehyde | 40 | are introduced into a 2-liter reactor provided with an agitator and immersed in a thermostatic bath at 35° C.

The starting polyoxymethylene used in this experiment has the following characteristics:

$\eta_{red}$ ---------------------------------- 0.75
Crystalline orthorhombic form, measured by X-ray examination _____percent__ 76

To the suspension having the above composition the following ingredients are added every hour, after having withdrawn the same amount by weight of suspension:

| | G. |
|---|---|
| $CH_2O$ solution 50% (by weight) | 27.7 |
| Aqueous $H_2SO_4$ solution, 96% (by weight) | 0.48 |

From the reactor 676.3 g. of suspension are discharged every 24 hours. From this suspension, after filtration, washing and drying, about 103 g. of polyoxymethylene corresponding to 1.4 g. of polymer per hour per 100 g. of pre-existing solid polymer are obtained. The experiment is stopped after 24 days. The amount of polymer obtained every day is practically constant. From the 10th day onwards the polymer has almost constant characteristics, more particularly:

$\eta_{red}$ ---------------------------------- <0.1
Crystalline orthorhombic form _____percent__ 0

EXAMPLE 3

2 kg. of a suspension consisting of 390 g. of polyoxymethylene and 1,610 g. of an aqueous solution having the following composition:

| | Percent |
|---|---|
| $H_2SO_4$ | 4.59 |
| Formaldehyde | 35.5 | are introduced into a 2-liter reactor provided with an agitator and immersed in a thermostatic bath at 35° C.

The starting polyoxymethylene used in this experiment has the following characteristics:

$\eta_{red}$ ---------------------------------- 0.75
Crystaline orthorhombic form, measured by X-ray examination _____percent__ 76

To the suspension having the above composition the following ingredients are added every hour, after having withdrawn the same amount by weight of suspension:

| | G. |
|---|---|
| $CH_2O$ solution, 50% (by weight) | 27.1 |
| Aqueous $H_2SO_4$ solution, 96% (by weight) | 1.09 |

From the reactor 676.5 g. of suspension are discharged every 24 hours. From this suspension, after filtration, washing and drying, 131 g. of polyoxymethylene corresponding to 1.4 g. of polymer per hour per 100 g. of pre-existing solid polymer are obtained. The experiment is stopped after 28 days. The amount of polymer obtained every day is practically constant. From the 7th day onward the polymer has almost constant characteristics, more particularly:

$\eta_{red}$ ---------------------------------- 0.15
Crystalline orthorhombic form _____percent__ 25–35

EXAMPLE 4

2 kg. of a suspension consisting of 428.1 g. of polyoxymethylene and 1,571.9 g. of an aqueous solution having the following composition:

| | Percent |
|---|---|
| $H_2SO_4$ | 6.5 |
| Formaldehyde | 33.0 | are introduced into a 2-liter reactor provided with an agitator and immersed in a thermostatic bath at 35° C.

The starting polyoxymethylene used in this experiment had the following characteristics:

$\eta_{red}$ ---------------------------------- 0.62
Crystalline orthorhombic form, measured by X-ray examination _____percent__ 80

To the suspension having the above composition the following ingredients are added every hour, after having withdrawn the same amount by weight of suspension:

| | G. |
|---|---|
| $CH_2O$ solution, 50% (by weight) | 26.5 |
| Aqueous $H_2SO_4$ solution, 96% (by weight) | 1.49 |

From the reactor 671.7 G. of suspension are discharged every 24 hours. From this suspension, after filtration, washing and drying, 143.8 g. of polyoxymethylene corresponding to 1.4 g. of polymer per hour per 100 g. of pre-existing solid polymer are obtained. The experiment is stopped after 28 days. The amount of polymer obtained every day is practically constant. From the 7th day onward the polymer has almost constant characteristics, more particularly:

$\eta_{red}$ ---------------------------------- 0.28
Crystalline orthorhombic form _____percent__ 50–60

EXAMPLE 5

2 kg. of a suspension consisting of 450.3 g. of polyoxymethylene and 1,549.7 g. of an aqueous solution having the following composition:

| | Percent |
|---|---|
| $H_2SO_4$ | 8.58 |
| Formaldehyde | 31 | are introduced into a 2-liter reactor provided with an agitator and immersed in a thermostatic bath at 35° C.

The starting polyoxymethylene used in this experiment had the following characteristics:

$\eta_{red}$ ---------------------------------- 0.75
Crystalline orthorhombic form, measured by X-ray examination _____percent__ 76

To the suspension having the above composition the following ingredients are added every hour, after having withdrawn the same amount by weight of suspension:

| | G. |
|---|---|
| $CH_2O$ solution, 50% (by weight) | 26.0 |
| Aqueous $H_2SO_4$ solution, 96% (by weight) | 1.93 |

From the reactor 670.3 g. of suspension are discharged every 24 hours. From this suspension, after filtration, washing and drying, about 150.9 g. of polyoxymethylene corresponding to 1.4 g. of polymer per hour per 100 g. of pre-existing solid polymer are obtained. The experiment is stopped after 28 days. The amount of polymer obtained every day is practically constant. From about the 14th day onwards the polymer has almost constant characteristics, more particularly:

$\eta_{red}$ ---------------------------------- 0.62
Crystalline orthorhombic form _____percent__ 70–75

EXAMPLE 6

2 kg. of a suspension consisting of 471.2 g. of polyoxymethylene and 1,528.8 g. of an aqueous solution having the following composition:

| | Percent |
|---|---|
| $H_2SO_4$ | 10.68 |
| Formaldehyde | 29 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 76 |
| Residual fraction resulting from the thermal treatment at 220° C. under vacuum with $Na_2CO_3$ ___ | 0 |

To the suspension having the above composition the following ingredients are added every hour, after having withdrawn the same amount by weight of suspension:

| | G. |
|---|---|
| $CH_2O$ solution, 50% (by weight) | 25.6 |
| Aqueous $H_2SO_4$ solution, 96% (by weight) | 2.38 |

From the reactor 671.5 g. of suspension are discharged every 24 hours. From this suspension, after filtration, washing and drying, 158.2 g. of polyoxymethylene corresponding to 1.4 g. of polymer per hour per 100 g. of pre-existing solid polymer are obtained. The experiment is stopped after 28 days. The amount of polymer obtained every day is practically constant. From about the 10th day onwards the polymer has almost constant characteristics, more particularly:

| | |
|---|---|
| $\eta_{red}$ | 0.65 |
| Crystalline orthorhombic form _____percent__ | 70–80 |
| Residual dietherified fraction resulting from the thermal treatment at 220° C. under vacuum with $Na_2CO_3$ _____percent__ | 10–15 |
| $K_d^{220}$ of the residual dietherified fraction | <0.1 |

EXAMPLE 7

28 kg. of a suspension consisting of 501.8 g. of polyoxymethylene and 1,498.2 g. of aqueous solution having the following composition:

| | Percent |
|---|---|
| $H_2SO_4$ | 12.9 |
| Formaldehyde | 26.5 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.62 |
| Crystalline orthorhombic form, measured by X-ray examination _____percent__ | 80 |

To the suspension having the above composition the following ingredients are added every hour, after having withdrawn the same amount by weight of suspension:

| | G. |
|---|---|
| $CH_2O$ solution, 50% (by weight) | 25.1 |
| Aqueous $H_2SO_4$ solution, 96% (by weight) | 2.8 |

From the reactor 669.6 g. of suspension are discharged every 24 hours. From this suspension, after filtration, washing and drying, about 168 g. of polyoxymethylene corresponding to 1.4 g. of polymer per hour per 100 g. of pre-existing solid polymer are obtained. The experiment is stopped after 31 days. The amount of polymer obtained every day is practically constant. From about the 10th day onwards the polymer has almost constant characteristics, more particularly:

| | |
|---|---|
| $\eta_{red}$ | 0.69 |
| Crystalline orthorhombic form _____percent__ | 80–85 |

EXAMPLE 8

2 kg. of a suspension consisting of 532.4 g. of polyoxymethylene and 1,467.6 g. of an aqueous solution having the following composition:

| | Percent |
|---|---|
| $H_2SO_4$ | 16.1 |
| Formaldehyde | 23.5 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.62 |
| Crystalline orthorhombic form, measured by X-ray examination _____percent__ | 80 |

To the suspension having the above composition the following ingredients are added every hour, after having withdrawn the same amount by weight of suspension:

| | G. |
|---|---|
| $CH_2O$ solution, 50% (by weight) | 24.7 |
| Aqueous $H_2SO_4$ solution, 96% (by weight) | 3.46 |

From the reactor 675.8 g. of suspension are discharged every 24 hours. From this suspension, after filtration, washing and drying, about 179.9 g. of polyoxymethylene corresponding to 1.4 g. of polymer per hour per 100 g. of pre-existing solid polymer are obtained. The experiment is stopped after 35 days. The amount of polymer obtained every day is practically constant. From about the 17th day onwards the polymer has almost constant characteristics, more particularly:

| | |
|---|---|
| $\eta_{red}$ | 0.60 |
| Crystalline orthorhombic form _____percent__ | 80–85 |

EXAMPLE 9

2 kg. of a suspension consisting of 561.3 g. of polyoxymethylene and 1,438.7 g. of an aqueous solution having the following composition:

| | Percent |
|---|---|
| $H_2SO_4$ | 18.23 |
| Formaldehyde | 21 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 80 |

To the suspension having the above composition the following ingredients are added every hour, after having withdrawn the same amount by weight of suspension:

| | G. |
|---|---|
| $CH_2O$ solution, 50% (by weight) | 24.0 |
| Aqueous $H_2SO_4$ solution, 96% (by weight) | 3.8 |

From the reactor 667.2 g. of suspension are discharged every 24 hours. From this suspension, after filtration, washing and drying, 187.2 g. of polyoxymethylene corresponding to 1.4 g. of polymer per hour per 100 g. of pre-existing solid polymer are obtained. The experiment is stopped after 31 days. The amount of polymer obtained every day is practically constant. From about the 17th day onwards the polymer has almost constant characteristics, more particularly:

| | |
|---|---|
| $\eta_{red}$ | 0.58 |
| Crystalline orthorhombic form _____percent__ | 75–80 |

EXAMPLE 10

2 kg. of a suspension consisting of 542.3 g. of polyoxymethylene and 1,457.7 g. of an aqueous solution having the following composition:

| | Percent |
|---|---|
| $H_2SO_4$ | 21.3 |
| Formaldehyde | 20.3 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.62 |
| Crystalline orthorhombic form, measured by X-ray examination _____percent__ | 80 |

To the suspension having the above composition the following ingredients are added every hour, after having withdrawn the same amount by weight of suspension:

| | G. |
|---|---|
| $CH_2O$ solution, 50% (by weight) | 23.5 |
| Aqueous $H_2SO_4$ solution, 96% (by weight) | 4.55 |

From the reactor 673.2 g. of suspension are discharged every 24 hours. From this suspension, after filtration, washing and drying, 182.5 g. of polyoxymethylene corresponding to 1.4 g. of polymer per hour per 100 g. of pre-existing solid polymer are obtained. The experiment is stopped after 28 days. The amount of polymer obtained every day is practically constant. From about the 7th day onwards the polymer has almost constant characteristics, more particularly:

| | |
|---|---|
| $\eta_{red}$ | 0.51 |
| Crystalline orthorhombic form _____percent__ | 65–75 |

EXAMPLE 11

2 kg. of a suspension consisting of 583.7 g. of polyoxymethylene and 1,416.3 g. of an aqueous solution having the following composition:

| | Percent |
|---|---|
| $H_2SO_4$ | 29.6 |
| Formaldehyde | 14.0 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.62 |
| Crystalline orthorhombic form, measured by X-ray examination _____percent__ | 30 |

To the suspension having the above composition the following ingredients are added ever hour, after having withdrawn the same amount by weight of suspension:

| | G. |
|---|---|
| $CH_2O$ solution, 50% (by weight) | 22.0 |
| Aqueous $H_2SO_4$ solution, 96% (by weight) | 6.13 |

From the reactor 675.1 g. of suspension are discharged every 24 hours. From this suspension, after filtration, washing and drying, 197 g. of polyoxymethylene corresponding to 1.4 g. of polymer per hour per 100 g. of pre-existing solid polymer are obtained. The experiment is stopped after 28 days. The amount of polymer obtained every day is practically constant. From about the 7th day onwards the polymer has almost constant characteristics, more particularly:

| | |
|---|---|
| $\eta_{red}$ | <0.24 |
| Crystalline orthorhombic form _____percent__ | 30–35 |

EXAMPLE 12

2 kg. of a suspension consisting of 528.1 g. of polyoxymethylene and 1,471.9 g. of an aqueous solution having the following composition:

| | Percent |
|---|---|
| $H_2SO_4$ | 42.3 |
| Formaldehyde | 10 | are introduced into a 2-liter reactor provided with an agitator and immersed in a thermostatic bath at 35° C.

The starting polyoxymethylene used in this experiment has the following characteristics:

| | |
|---|---|
| $\eta_{red}$ | 0.62 |
| Crystalline orthorhombic form, measured by X-ray examination _____percent__ | 80 |

To the suspension having the above composition the following ingredients are added every hour, after having withdrawn the same amount by weight of suspension:

| | G. |
|---|---|
| $CH_2O$ solution, 50% (by weight) | 18.9 |
| Aqueous $H_2SO_4$ solution, 96% (by weight) | 9.08 |

From the reactor 671.5 g. of suspension are discharged every 24 hours. From this suspension, after filtration, washing and drying, 177.3 g. of polyoxymethylene corresponding to 1.4 g. of polymer per hour per 100 g. of pre-existing solid polymer are obtained. The experiment is stopped after 17 days. The amount of polymer obtained every day is practically constant. From about the 7th day onwards the polymer has almost constant characteristics, more particularly:

| | |
|---|---|
| $\eta_{red}$ | 0.1 |
| Crystalline orthorhombic form _____percent__ | 0 |

EXAMPLE 13

2 kg. of a suspension consisting of 265.2 g. of polyoxymethylene and 1,734.8 g. of an aqueous solution having the following composition:

| | Percent |
|---|---|
| Paratoluenesulfonic acid | 4.29 |
| Formaldehyde | 40 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 76 |

To the suspension having the above composition the following ingredients are added every hour, after having withdrawn the same amount by weight of suspension:

| | G. |
|---|---|
| $CH_2O$ solution, 50% (by weight) | 26.76 |
| $CH_3$—$C_6H_4$—$SO_3H \cdot H_2O$ (para) solid | 1.14 |

From the reactor 669.6 g. of suspension are discharged every 24 hours. From this suspension, after filtration, washing and drying about 88.7 g. of polyoxymethylene corresponding to 1.4 g. of polymer per hour per 100 g. of pre-existing solid polymer are obtained. The experiment is stopped after 21 days. The amount of polymer obtained every day is practically constant. From about the 14th day onwards the polymer has almost constant characteristics, more particularly:

| | |
|---|---|
| $\eta_{red}$ | <0.1 |
| Crystalline orthorhombic form _____percent__ | 0 |

EXAMPLE 14

2 kg. of a suspension consisting of 322.0 g. of polyoxymethylene and 1,678.0 g. of an aqueous solution having the following composition:

| | Percent |
|---|---|
| Paratoluenesulfonic acid | 11.59 |
| Formaldehyde | 34 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 76 |

To the suspension having the above composition the following ingredients are added every hour, after having withdrawn the same amount by weight of suspension:

| | G. |
|---|---|
| CH$_2$O solution, 50% (by weight) | 24.91 |
| CH$_3$—C$_6$H$_4$—SO$_3$H.H$_2$O (para) solid | 2.98 |

From the reactor 669.5 g. of suspension are discharged every 24 hours. From this suspension, after filtration, washing and drying, 107.8 g. of polyoxymethylene corresponding to 1.4 g. of polymer per hour per 100 g. of pre-existing solid polymer are obtained. The experiment is stopped after 24 days. The amount of polymer obtained every day is practically constant. From the 10th day onwards the polymer has almost constant characteristics, more particularly:

| | |
|---|---|
| $\eta_{red}$ | 0.42 |
| Crystalline orthorhombic form _____percent__ | 65–70 |

EXAMPLE 15

2 kg. of a suspension consisting of 315 g. of polyoxymethylene and 1,685 g. of an aqueous solution having the following composition:

| | Percent |
|---|---|
| Paratoluenesulfonic acid | 15.69 |
| Formaldehyde | 32 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 76 |
| Residual fraction resulting from the thermal treatment at 220° C. under vacuum with Na$_2$CO$_3$ | 0 |

To the suspension having the above composition the following ingredients are added every hour, after having withdrawn the same amount by weight of suspension:

| | G. |
|---|---|
| CH$_2$O solution, 50% (by weight) | 23.84 |
| CH$_3$—C$_6$H$_4$—SO$_3$H.H$_2$O (para) solid | 4.07 |

From the reactor 669.8 g. of suspension are discharged every 24 hours. From this suspension, after filtration, washing and drying, 105.5 g. of polyoxymethylene corresponding to 1.4 g. of polymer per hour per 100 g. of pre-existing solid polymer are obtained. The experiment is stopped after 28 days. The amount of polymer obtained every day is practically constant. From about the 14th day onwards the polymer has almost constant characteristics, more particularly:

| | |
|---|---|
| $\eta_{red}$ | 0.52 |
| Crystalline orthorhombic form _____percent__ | 82–88 |
| Residual dietherified fraction resulting from the thermal treatment at 220° C. under vacuum with Na$_2$CO$_3$ _____percent__ | 10–15 |
| $K_d^{220}$ of the dietherified fraction _____do____ | <0.1 |

EXAMPLE 16

2 kg. of a suspension consisting of 343 g. of polyoxymethylene and 1,657 g. of an aqueous solution having the following composition:

| | Percent |
|---|---|
| HClO$_4$ | 6.49 |
| Formaldehyde | 35 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 76 |

To the suspension having the above composition the following ingredients are added every hour, after having withdrawn the same amount by weight of suspension:

| | G. |
|---|---|
| CH$_2$O solution, 50% (by weight) | 25.83 |
| Aqueous HClO$_4$ solution, 80% (by weight) | 2.16 |

From the reactor 671.8 g. of suspension are discharged every 24 hours. From this suspension, after filtration, washing and drying, 115.2 g. of polyoxymethylene corresponding to 1.4 g. of polymer per hour per 100 g. of pre-existing solid polymer are obtained. The experiment is stopped after 26 days. The amount of polymer obtained every day is practically constant. From about the 10th day onwards the polymer has almost constant characteristics, more particularly:

| | |
|---|---|
| $\eta_{red}$ | 0.37 |
| Crystalline orthorhombic form _____percent__ | 76–82 |

EXAMPLE 17

2 kg. of a suspension consisting of 334.2 g. of polyoxymethylene and 1,655.8 g. of an aqueous solution having the following composition:

| | Percent |
|---|---|
| HClO$_4$ | 9.24 |
| Formaldehyde | 33 | are introduced into a 2-liter reactor provided with an agitator and immersed in a thermostatic bath at 35° C.

The starting polyoxymethylene used in this experiment had the following characteristics:

| | |
|---|---|
| $\eta_{red}$ | 0.75 |
| Crystalline orthorhombic form, measured by X-ray examination _____percent__ | 76 |

To the suspension having the above composition the following ingredients are added every hour, after having withdrawn the same amount by weight of suspension:

| | G. |
|---|---|
| CH$_2$O solution, 50% (by weight) | 24.82 |
| Aqueous HClO$_4$ solution, 70% (by weight) | 3.04 |

From the reactor 668.7 g. of suspension are discharged every 24 hours. From this suspension, after filtration, washing and drying, 115.1 g. of polyoxymethylene corresponding to 1.4 g. of polymer per hour per 100 g. of pre-existing solid polymer are obtained. The experiment is stopped after 28 days. The amount of polymer obtained every day is practically constant. From about the 10th day onwards the polymer has almost constant characteristics, more particularly:

| | |
|---|---|
| $\eta_{red}$ | 0.56 |
| Crystalline orthorhombic form _____percent__ | 87–92 |

EXAMPLE 18

2 kg. of a suspension consisting of 342.6 g. of polyoxymethylene and 1,657.4 g. of an aqueous solution having the following composition:

| | Percent |
|---|---|
| HClO$_4$ | 12.12 |
| Formaldehyde | 31 | are introduced into a 2-liter reactor provided with an agitator and immersed in a thermostatic bath at 35° C.

The starting polyoxymethylene used in this experiment had the following characteristics:

$\eta_{red}$ ---- 0.75
Crystalline orthorhombic form, measured by X-ray examination ---- percent -- 76
Residual fraction resulting from the thermal treatment at 220° C. under vacuum with $Na_2CO_3$ --- 0

To the suspension having the above composition the following ingredients are added every hour, after having withdrawn the same amount by weight of suspension:

G.
$CH_2O$ solution, 50% (by weight) ---- 23.98
Aqueous $HClO_4$ solution, 70% (by weight) ---- 4.02

From the reactor 672 g. of suspension are discharged every 24 hours. From this suspension, after filtration, washing and drying, 115.1 g. of polyoxymethylene corresponding to 1.4 g. of polymer per hour per 100 g. of pre-existing solid polymer are obtained. The experiment is stopped after 28 days. The amount of polymer obtained every day is practically constant. From about the 10th day onwards the polymer has almost constant characteristics, more particularly:

$\eta_{red}$ ---- 0.57
Crystalline orthorhombic form ---- percent -- 85–90
Residual dietherified fraction resulting from the thermal treatment 220° C. under vacuum with $Na_2CO_3$ ---- percent -- 10–15
$K_d{}^{220}$ of the dietherified fraction ---- <0.1

EXAMPLE 19

2 kg. of a suspension consisting of 354.6 g. of polyoxymethylene and 1,645.4 g. of an aqueous solution having the following composition:

Percent
$HClO_4$ ---- 17.02
Formaldehyde ---- 27 are introduced into a 2-liters reactor provided with an agitator and immersed in a thermostatic bath at 35° C.

The starting polyoxymethylene used in this experiment had the following charatceristics:

$\eta_{red}$ ---- 0.75
Crystalline orthorhombic form, measured by X-ray examination ---- percent -- 76

To the suspension having the above composition the following ingredients are added every hour, after having withdrawn the same amount by weight of suspension:

G.
$CH_2O$ solution, 50% (by weight) ---- 22.45
Aqueous $HClO_4$ solution, 70% (by weight) ---- 5.61

From the reactor 673.4 g. of suspension are discharged every 24 hours. From this suspension, after filtration, washing and drying, 119.4 g. of polyoxymethylene corresponding to 1.4 g. of polymer per hour per 100 g. of pre-existing solid polymer are obtained. The experiment is stopped after 28 days. The amount of polymer obtained every day is practically constant. From about the 10th day onwards the polymer has almost constant characteristics, more particularly:

$\eta_{red}$ ---- 0.50
Orthorhombic crystalline form ---- percent -- 56–62

EXAMPLE 20

2 kg. of a suspension consisting of 332 g. of polyoxymethylene and 1,668 g. of an aqueous solution having the following composition:

Percent
$HClO_4$ ---- 22.04
Formaldehyde ---- 25 are introduced into a 2-liters reactor provided with an agitator and immersed in a thermostatic bath at 35° C.

The starting polyoxymethylene used in this experiment had the following characteristics:

$\eta_{red}$ ---- 0.75
Crystalline orthorhombic form, measured by X-ray examination ---- percent -- 76

To the suspension having the above composition the following ingredients are added every hour, after having withdrawn the same amount by weight of suspension:

G.
$CH_2O$ solution, 50% (by weight) ---- 21.2
Aqueous $HClO_4$ solution, 70% (by weight) ---- 7.1

From the reactor 679.2 g. of suspension are discharged every 24 hours. From this suspension, after filtration, washing and drying, 112.8 g. of polyoxymethylene corresponding to 1.4 g. of polymer per hour per 100 g. of pre-existing solid polymer are obtained. The experiment is stopped after 28 days. The amount of polymer obtained every day is practically constant. From about the 10th day onwards the polymer has almost constant characteristics, more particularly:

$\eta_{red}$ ---- 0.35
Crystalline orthorhombic form ---- percent -- 50–55

EXAMPLE 21

2 kg. of a suspension consisting of 380.6 g. of polyoxymethylene and 1,619.4 g. of an aqueous solution having the following composition:

Percent
HCl ---- 2.27
Formaldehyde ---- 35 are introduced into a 2-liters reactor provided with an agitator and immersed in a thermostatic bath at 35° C.

The starting polyoxymethylene used in this experiment had the following characteristics:

$\eta_{red}$ ---- 0.62
Crystalline orthorhombic form, measured by X-ray examination ---- percent -- 82

To the suspension having the above composition the following ingredients are added every hour, after having withdrawn the same amount by weight of suspension:

G.
$CH_2O$ solution, 50% (by weight) ---- 26.4
Aqueous HCl solution, 35% (by weight) ---- 1.46

From the reactor 668.6 g. of suspension are discharged every 24 hours. From this suspension, after filtration, washing and drying, 127.2 g. of polyoxymethylene corresponding to 1.4 g. of polymer per hour per 100 g. of pre-existing solid polymer are obtained. The experiment is stopped after 26 days. The amount of polymer obtained every day is practically constant. From the 9th day onwards the polymer has almost constant characteristics, more particularly:

$\eta_{red}$ ---- 0.27
Crystalline orthorhombic form ---- percent -- 55–65

EXAMPLE 22

2 kg. of a suspension consisting of 345.2 g. of polyoxymethylene and 1,654.8 g. of an aqueous solution having the following composition:

Percent
HCl ---- 8
Formaldehyde ---- 31 are introduced into a 2-liters reactor provided with an agitator and immersed in a thermostatic bath at 35 °C.

The starting polyoxymethylene used in this experiment had the following characteristics:

$\eta_{red}$ ---- 0.75
Crystalline orthorhombic form, measured by X-ray examination ---- percent -- 76

To the suspension having the above composition the following ingredients are added every hour, after having withdrawn the same amount by weight of suspension:

|   | G. |
|---|---|
| CH$_2$O solution, 50% (by weight) | 23.8 |
| Aqueous HCl solution, 35% (by weight) | 3.9 |

From the reactor 665 g of suspension are discharged every 24 hours. From this suspension, after filtration, washing and drying, 113 g. of polyoxymethylene corresponding to 1.4 g. of polymer per hour per 100 g. of pre-existing solid polymer are obtained. The experiment is stopped after 30 days. The amount of polymer obtained every day is practically constant. From about the 10th day onwards the polymer has almost constant characteristics, more particularly:

$\eta_{red}$ ---- 0.59
Crystalline orthorhombic form ____percent__ >90

EXAMPLE 23

2 kg. of a suspension consisting of 316.6 of polyoxymethylene and 1,683.4 g. of an aqueous solution having the following composition:

|   | Percent |
|---|---|
| HCl | 8 |
| Formaldehyde | 29 | are introduced into a 2-liter reactor provided with an agitator and immersed in a thermostatic bath at 35° C.

The starting polyoxymethylene used in this experiment had the following characteristics:

$\eta_{red}$ ---- 0.75
Crystalline orthorhombic form, measured by X-ray examination ____percent__ 76
Residual fraction resulting from the thermal treatment at 220° C. under vacuum with Na$_2$CO$_3$ ____ 0

To the suspension having the above composition the following ingredients are added every hour, after having withdrawn the same amount by weight of suspension:

|   | G. |
|---|---|
| CH$_2$O solutiton, 50% (by weight) | 22.4 |
| Aqueous HCL solution, 35% (by weight) | 5.4 |

From the reactor 665 g. of suspension are discharged every 24 hours. From this suspension, after filtration, washing and drying, 104 g. of polyoxymethylene corresponding to 1.4 g. of polymer per hour per 100 g. of pre-existing solid polymer are obtained. The experiment is stopped after 33 days. The amount of polymer obtained every day is practically constant. From about the 13th day the polymer has almost constant characteristics, more particularly:

$\eta_{red}$ ---- 0.56
Crystalline orthorhombic form ____percent__ 90
Residual dietherified fraction resulting from the thermal treatment at 220° C. with Na$_2$CO$_3$ ____percent__ 10–15
K$_d^{220}$ of the dietherified fraction ____ <0.1

EXAMPLE 24

2 kg. of a suspension consisting of 362.4 g. of polyoxymethylene and 1,637.6 g. of aqueous solution having the following composition:

|   | Percent |
|---|---|
| HCl | 13.2 |
| Formaldehyde | 20.4 | are introduced into a 2-liter reactor provided with an agitator and immersed in a thermostatic bath at 35° C.

The starting polyoxymethylene used in this experiment had the following characteristics:

$\eta_{red}$ ---- 0.62
Crystalline orthorhombic formed, measured X-ray examination ____percent__ 82

To the suspension having the above composition the following ingredients are added every hour, after having withdrawn the same amount by weight of suspension:

|   | G. |
|---|---|
| CH$_2$O solution, 50% (by weight) | 19.4 |
| Aqueous HCl solution, 35% (by weight) | 8.7 |

From the reacteor 674.4 g. of suspension are discharged every 24 hours. From this suspension, after filtration, washing and drying 122.2 g. of polyoxymethylene corresponding to 1.4 g. of polymer per hour per 100 g. of pre-existing solid polymer are obtained. The experiment is stopped after 29 days. The amount of polymer obtained every day is practically constant. From about the 13th day onwards the polymer has almost constant characteristics, more particularly:

$\eta_{red}$ ---- 0.16
Crystalline orthorhombic form ____percent__ 25–35

EXAMPLE 25

2 kg. of a suspension consisting of 589 g. of polyoxymethylene and 1,411 g. of an aqueous solution having the following composition:

|   | Percent |
|---|---|
| H$_2$SO$_4$ | 13.7 |
| Formaldehyde | 22 | are introduced into a 2-liter reactor provided with an agitator and immersed in a thermostatic bath at 20° C.

The starting polyoxymethylene used in this experiment had the following characteristics:

$\eta_{red}$ ---- 0.75
Crystalline orthorhombic form, measured by X-ray examination ____percent__ 76

To the suspension having the above composition the following ingredients are added every hour, after having withdrawn the same amount by weight of suspension:

|   | G. |
|---|---|
| CH$_2$O solution 50% (by weight) | 25.3 |
| Aqueous H$_2$SO$_4$ solution 96% (by weight) | 2.3 |

From the reactor 675 g. of suspension are discharged every 24 hours. From this suspension, after filtration, washing and drying, 202 g. of polyoxymethylene corresponding to 1.4 g. of polymer per hour per 100 g. of pre-existing solid polymer are obtained. The experiment is stopped after 29 days. The amount of polymer obtained every is practically constant. From the 13th day onwards the polymer has almost constant characteristics, more particularly:

|   | G. |
|---|---|
| $\eta_{red}$ | 0.35 |
| Crystalline orthorhombic form ____percent__ | 65–75 |

EXAMPLE 26

2 kg. of a suspension consisting of 244.3 g. of polyoxymethylene and 1,755.7 g. of a solution having the following composition:

|   | Percent |
|---|---|
| HCl | 2 |
| CH$_3$OH | 5 |
| CH$_2$O | 38 | are introduced into a reactor having a capacity of about 2 liters, provided with an agitator and immersed in a thermostatic bath at 35° C.

The starting polyoxymethylene used in this test has the following characteristics:

$\eta_{red}$ ---- 0.58
Crystalline orthorhombic form ____percent__ 89
Residual fraction resulting from the thermal treatment at 220° C. under vacuum with Na$_2$CO$_3$ ___ 0

To the suspension having the above composition the following ingredients are added every hour (after having withdrawn the same amount of the suspension by weight):

| | G. |
|---|---|
| Aqueous CH$_2$O solution, 50% (by weight) | 25.3 |
| Aqueous HCl solution, 37% (by weight) | 1.27 |
| Methanol (99% by weight) | 1.17 |

From the reactor about 666 g. of suspension are discharged every 24 hours. From this suspension, after filtration, washing and drying, about 80 g. of polymer are obtained. The experiment is stopped after 35 days. The amount of polymer obtained every day is practically constant. From about the 24th day onwards the polymer has almost constant characteristics, more particularly:

| | |
|---|---|
| $\eta_{red}$ | 0.36 |
| Percent crystalline orthorhombic form | 75–85 |
| Residual dietherified fraction resulting from the thermal treatment at 220° C. under vacuum with Na$_2$CO$_3$ percent | 15–25 |
| K$_d^{220}$ of the residual dietherified fraction | <0.1 |

EXAMPLE 27

2 kg. of a suspension consisting of 196.9 g. of polyoxymethylene and of 1,803.1 of a solution having the following composition:

| | Percent |
|---|---|
| HCl | 4 |
| CH$_3$OH | 5 |
| Formaldehyde | 37 | are introduced into a reactor having a capacity of about 2 liters provided with an agitator and immersed in a thermostatic bath at 35° C.

The starting polyoxymethylene used in this experiment has the following characteristics:

| | |
|---|---|
| $\eta_{red}$ | 0.58 |
| Crystalline orthorhombic form percent | 89 |
| Residual fraction resulting from the treatment at 220° C. under vacuum with Na$_2$CO$_3$ | 0 |

To the suspension having the above composition the following ingredients are added every hour (after having withdrawn the same amount of the suspension by weight):

| | G. |
|---|---|
| Aqueous CH$_2$O solution, 50% (by weight) | 23.7 |
| Aqueous HCl solution, 37% (by weight) | 2.5 |
| Methanol having a purity 99% | 1.18 |

From the reactor about 657 g. of suspension are discharged every 24 hours. From this suspension, after filtration, washing and drying, about 60 g. of polymer are obtained. The experiment is stopped after 40 days. The amount of polymer obtained every day is practically constant. From about the 30th day the polymer has almost constant characteristics, more particularly:

| | |
|---|---|
| $\eta_{red}$ | 0.45 |
| Percent crystalline orthorhombic form | 80–90 |
| Residual dietherified fraction resulting from the thermal treatment at 220° C. under vacuum with Na$_2$CO$_3$ percent | 25–35 |
| K$_d^{220}$ of the residual dietherified fraction | <0.1 |

EXAMPLE 28

2 kg. of a suspension consisting of 277.1 g. of polyoxymethylene and of 1,722.9 g. of a solution having the following composition:

| | Percent |
|---|---|
| CH$_2$O | 33 |
| CH$_3$OH | 2 |
| HCl | 6 | are introduced into a reactor having a capacity of 2 liters provided with an agitator and immersed in a thermostatic bath at 35° C.

The starting polyoxymethylene used in this experiment has the following characteristics:

| | |
|---|---|
| $\eta_{red}$ | 0.58 |
| Crystalline orthorhombic form percent | 89 |
| Residual fraction resulting from the thermal treatment at 220° C. under vacuum with Na$_2$CO$_3$ | 0 |

To the suspension having the above composition the following ingredients are added every hour (after having withdrawn the same amount of the suspension by weight):

| | G. |
|---|---|
| CH$_2$O solution, 50% aqueous | 23.2 |
| HCl solution, 37% aqueous | 3.78 |
| Methanol with a purity 99% by weight | 0.466 |

From the reactor about 657 g. of suspension are discharged every 24 hours. From this suspension, after filtration, washing and drying about 88 g. of polymer are obtained. The experiment is stopped after 30 days; the amount of polymer obtained every day is practically constant. After about the 18th day the polymer has almost constant characteristics, more particularly:

| | |
|---|---|
| $\eta_{red}$ | 0.44 |
| Percent crystalline orthorhombic form | >90 |
| Residual dietherified fraction resulting from the thermal treatment at 220° C. under vacuum with Na$_2$CO$_3$ percent | 15–25 |
| K$_d^{220}$ of the dietherified fraction | <0.1 |

EXAMPLE 29

2 kg. of a suspension consisting of 115.3 g. of polyoxymethylene and of 1,884.7 g. of a solution having the following composition:

| | Percent |
|---|---|
| HCl | 6 |
| CH$_3$OH | 8 |
| Formaldehyde | 35 | are introduced into a reactor having a capacity of about 2 liters provided with an agitator and immersed in a thermostatic bath at 35° C.

The starting polyoxymethylene used for this experiment has the following characteristics:

| | |
|---|---|
| $\eta_{red}$ | 0.58 |
| Crystalline orthorhombic form by X-ray examination percent | 89 |
| Residual fraction resulting from the thermal treatment at 220° C. under vacuum with Na$_2$CO$_3$ | 0 |

To the suspension having the above composition the following ingredients are added every hour (after having withdrawn the same amount of the suspension by weight):

| | G. |
|---|---|
| 50% (by weight) aqueous CH$_2$O solution | 21.5 |
| 37% (by weight) aqueous HCl solution | 4.2 |
| Methanol with a purity >99% by weight | 2.1 |

From the reactor about 665 g. of suspension are discharged every 24 hours. From this suspension, after filtration, washing and drying, about 35 g. of polymer are obtained. The experiment is stopped after 24 days. The amount of polymer obtained every day is practically constant. From about the 14th day the polymer had almost constant characteristics, more particularly:

| | |
|---|---|
| $\eta_{red}$ | 0.37 |
| Percent crystalline orthohombic form | >90 |
| Residual dietherified fraction resulting from the thermal treatment under vacuum with Na$_2$CO$_3$ percent | 50–55 |
| K$_d^{220}$ of the residual dietherified fraction | >0.1 |

EXAMPLE 30

2 kg. of a suspension consisting of 217.8 g. of polyoxymethylene and of 1,782.2 g. of a solution having the following composition:

| | Percent |
|---|---|
| HCl | 4 |
| $CH_2OH$ | 5 |
| NaCl | 10 |
| Formaldehyde | 31 | are introduced into a reactor having a capacity of about 2 liters provided with an agitator and immersed in a thermostatic bath at 35° C.

The starting polyoxymethylene used in this experiment has the following characteristics:

| | |
|---|---|
| $\eta_{red}$ | 0.58 |
| Crystalline orthohombic form, measured by X-ray examination ___percent__ | 89 |
| Residual fraction resulting from the thermal treatment at 220° C. under vacuum with $Na_2CO_3$ | 0 |

To the suspension having the above composition the following ingredients are added every hour (after having withdrawn the same amount of the suspension by weight):

| | G. |
|---|---|
| 50% (by weight) aqueous $CH_2O$ solution | 21.2 |
| 37% (by weight) aqueous HCl solution | 2.7 |
| Methanol with a purity 99% by weight | 1.2 |
| Powdered NaCl | 2.5 |

From the reactor about 660 g. of suspension are discharged every 24 hours. From this suspension, after filtration, washing and drying about 70 g. of polymer are obtained. The experiment is stopped after 40 days. The amount of polymer obtained every day is practically constant. From about the 25th day the polymer has almost constant characteristics, more particularly:

| | |
|---|---|
| $\eta_{red}$ | 0.32 |
| Percent crystalline orthorhombic form | >80 |
| Residual dietherified fraction resulting from the thermal treatment with a sodium carbonate under vacuum at 220° C. ___percent__ | 55–65 |
| The residual dietherified fraction has a $K_d^{220}$ | >0.1 |

EXAMPLE 31

2 kg. of a suspension consisting of 273.7 g. of polyoxymethylene and of 1,726.3 g. of a solution having the following composition:

| | Percent |
|---|---|
| HCl | 5.4 |
| $CH_3OH$ | 5.4 |
| $CH_2O$ | 28 |
| NaCl | 8.3 | are introduced into a reactor having a capacity of about 2 liters provided with an agitator and immersed in a thermostatic bath at 35° C.

The starting polyoxymethylene used in this experiment has the following composition:

| | |
|---|---|
| $\eta_{red}$ | 0.58 |
| Crystalline orthorhombic form measured by X-ray examination ___percent__ | 89 |
| Residual fraction resulting from the thermal treatment at 220° C. under vacuum with $Na_2CO_3$ | 0 |

To the suspension having the above composition the following ingredients are added every hour (after having withdrawn the same amount of the suspension by weight):

| | G. |
|---|---|
| 50% (by weight) aqueous $CH_2O$ solution | 21.6 |
| 37% (by weight) aqueous HCl solution | 3.6 |
| Methanol having a purity 99% by weight | 1.31 |
| Powdered NaCl | 2.3 |

From the reactor about 682 g. of suspension are discharged every 24 hours. From this suspension, after filtration, washing and drying, about 90 g. of polymer are obtained. The experiment is stopped after 40 days. The amount of polymer obtained every day is practically constant. From about the 25th day onwards the polymer had almost constant characteristics, more particularly.

| | |
|---|---|
| $\eta_{red}$ | 0.30 |
| Percent crystalline orthorhombic form | >95 |
| Residual dietherified fraction resulting from the thermal treatment at 220° C. under vacuum with $Na_2CO_3$ ___percent__ | 55–75 |
| The residual dietherified fraction has a $K_d^{220}$ | >0.1 |

EXAMPLE 32

2 kg. of a suspension consisting of 273.6 g. of polyoxymethylene and 1,726.4 g. of an aqueous solution having the following composition:

| | Percent |
|---|---|
| HCl | 5.4 |
| $CH_3OH$ | 5.4 |
| $CH_2O$ | 28 |
| KCl | 8.3 | are introduced into a reactor having a capacity of 2 liters, provided with an agitator and immersed in a thermostatic bath at 35° C.

The starting polyoxymethylene used in this experiment has the following characteristics:

| | |
|---|---|
| $\eta_{red}$ | 0.58 |
| Crystalline orthorhombic form ___percent__ | 89 |
| Residual fraction resulting from the thermal treatment at 220° C. under vacuum with $Na_2CO_3$ | 0 |

To the suspension having the above composition the following ingredients are added every hour (after having withdrawn the same amount of the suspension by weight):

| | G. |
|---|---|
| Aqueous $CH_2O$ solution, 50% (by weight) | 21.5 |
| Aqueous HCl solution, 37% (by weight) | 3.6 |
| Methanol with a purity 99% (by weight) | 1.3 |
| Powdered KCl | 2 |

From the reactor about 682 g. of suspension are discharged every 24 hours. From this suspension after filtration, washing and drying, about 90 g. of polymer are obtained. The experiment is stopped after 42 days. The amount of polymer obtained every day is practically constant. From about the 25th day onwards the polymer has almost constant characteristics, more particularly:

| | |
|---|---|
| $\eta_{red}$ | 0.31 |
| Crystalline orthorhombic form | >90% |
| Residual dietherified fraction resulting from the thermal treatment at 220° C. under vacuum with $Na_2CO_3$ ___percent__ | 55–75 |
| The residual dietherified fraction has a $K_d^{220}$ | <0.1 |

EXAMPLE 33

2.780 kg. of a suspension consisting of 695 g. of polyoxymethylene having $\eta_{red}=0.55$ and orthorhombic crystallinity of 85% (determined by X-ray examination) and of a solution having the following composition:

| | G. |
|---|---|
| $H_2SO_4$ (11%) | 229.5 |
| $CH_3OH$ (7%) | 146.0 |
| $CH_2O$ (32%) | 667.0 |
| $H_2O$ (50%) | 1,042.5 | are introduced into a reactor having a capacity of 3 liters, provided with an agitator and immersed in a thermostatic bath at 35° C.

To the suspension having the said composition the following ingredients are added every 2 hours (after having withdrawn the same amount of the suspension by weight):

| | G. |
|---|---|
| Aqueous $CH_2O$ solution, 57% (by weight) | 66.8 |
| Aqueous $H_2SO_4$ solution, 96% (by weight) | 6.7 |
| Methanol, 99.9% (by weight) | 4.1 |

From the reactor about 935 g. of suspension are discharged every 24 hours. From this suspension, after filtration, washing and drying, about 223 g. of polymer are obtained. The experiment is stopped after 35 days. The amount of polymer obtained every day is practically constant. The characteristics of the polymer when the system is under stationary conditions are:

$\eta_{red}$ ------------------------------------ 0.55
Percent crystalline orthorhombic form --------- 70

The products subjected to a treatment with a 1M sodium carbonate solution at 100° C. for 1 hour loses 25% by weight.

By a successive treatment to melting at 220° C. under vacuum for 20 minutes it undergoes a further loss of 25%, referred to the initial weight.

The characteristics of the residual products are $\eta_{red}$ ------------------------------------ 0.60
$K_d^{220}$ ----------------------------------- <0.1

By infrared examination it gives a spectrum shown in the picture. In spectrum B, it can be noted that there is almost complete disappearance of the absorption band at 2.9 microns characteristic of the hydroxyls of polyoxymethylene diglycols.

EXAMPLE 34

2 kg. of a suspension consisting of 333.8 g. of polyoxymethylene and of 1,666.2 g. of a solution having the following composition:

| | Percent |
|---|---|
| $H_2SO_4$ | 9.6 |
| $CH_3OH$ | 6 |
| Formaldehyde | 32 | are introduced into a reactor having a capacity of 2 liters, provided with an agitator and immersed in a thermostatic bath at 35° C.

The starting polyoxymethylene used in this experiment has the following characteristics:

$\eta_{red}$ ------------------------------------ 0.78
Crystalline orthorhombic form measured by X-ray examination ------------------------percent-- 76

To the suspension having the above composition the following ingredients are added every hour (after having withdrawn the same amount of the suspension by weight):

| | G. |
|---|---|
| Aqueous $CH_2O$ solution 50% (by weight) | 24.4 |
| Aqueous $H_2SO_4$ solution, 96% (by weight) | 2.2 |
| Methanol having a purity 99% (by weight) | 1.49 |

From the reactor about 676 g. of suspension are discharged every 24 hours. From this suspension, after filtration, washing and drying, about 100 g. of polymer are obtained. The experiment is stopped after 29 days. The amount of polymer obtained every day is practically constant. After about 15 days the polymer has almost constant characteristics, more particularly:

$\eta_{red}$ ------------------------------------ 0.6
Percent crystalline orthorhombic form --------- <95

The product subjected to a treatment with a sodium carbonate solution loses 35–45% by weight.

The successive treatment to melting at 220° C. under vacuum causes a further loss of 25–35%, referred to the initial weight.

$K_d^{220}$ of the residual dietherified fraction, <0.1.

EXAMPLE 35

A suspension consisting of 695 g. of polyoxymethylene (having $\eta_{red}$=0.60 and crystalline orthorhombic form= 89%) and of 2,085 g. of a solution having the following composition:

| | Percent |
|---|---|
| $CH_2O$ | 29 |
| $CH_3OH$ | 7 |
| $H_2O$ | 49 |
| $H_2SO_4$ | 15 | are introduced into a reactor having a capacity of 3 liters, provided with an agitator and immersed in a thermostatic bath at 35° C.

To the suspension having the above composition the following ingredients are added every hour (after having withdrawn the same amount of the suspension by weight):

| | G. |
|---|---|
| Aqueous $CH_2O$ solution, 56.2% (by weight) | 31.35 |
| Aqueous $H_2SO_4$ solution, 96% (by weight) | 4.56 |
| Methanol, 99.9% (by weight) | 2.04 |

From the reactor about 934 g. of suspension are discharged every 24 hours. From this suspension, after filtration, washing and drying, about 233 g. of polymer are obtained. After 100 hours the polymer has almost constant characteristics, more particularly:

$\eta_{red}$ ------------------------------------ 0.58
Percent crystalline orthorhombic form --------- >65

The product subjected to a treatment with a 1 M sodium carbonate solution for 1 hour at 100° C. loses 15% by weight.

The successive treatment to melting at 220° C. under vacuum for 20 minutes causes a further loss of 30%, referred to the initial weight.

The characteristics of the residual polymer are:

$\eta_{red}$ ------------------------------------ 0.58
$K_d^{220}$ ----------------------------------- <0.1

EXAMPLE 36

2 kg. of a suspension consisting of 202.8 g. of polyoxymethylene and of 1,797.2 of a solution having the following composition:

| | Percent |
|---|---|
| $HClO_4$ | 10.8 |
| $CH_3OH$ | 5 |
| Formaldehyde | 34 | are introduced into a reactor having a capacity of about 2 liters provided with an agitator and immersed in a thermostatic bath at 35° C.

The starting polyoxymethylene used for the experiment has the following characteristics:

$\eta_{red}$ ------------------------------------ 0.78
Crystalline orthorhombic form by X-ray examination ------------------------------percent-- 70
Residual fraction resulting from the thermal treatment at 220° C. under vacuum with $Na_2CO_3$ --- 0

To the suspension having the above composition the following ingredients are added every hour (after having withdrawn the same amount of the suspension by weight):

| | G. |
|---|---|
| Aqueous $CH_2O$ solution, 50% (by weight) | 11.23 |
| Aqueous $HClO_4$ solution 70% (by weight) | 1.88 |
| Methanol with a purity 99% (by weight) | 0.68 |

From the reactor about 331 g. of suspension are discharged every 24 hours. From this suspension, after filtration, washing and drying, about 30 g. of polymer are obtained.

The experiment is stopped after 34 days. The amount of polymer obtained every day is practically constant. From about the 28th day onwards the polymer has almost constant characteristics, more particularly:

$\eta_{red}$ ------------------------------------ 0.55
Percent crystalline orthorhombic form --------- >90
Residual dietherified fraction resulting from the thermal treatment at 220° C. under vacuum with $Na_2CO_3$ --------------------percent-- 25–35
The residual dietherified fraction has a $K_d^{220}$ ---- <0.1

EXAMPLE 37

2 kg. of a suspension consisting of 353.8 g. of polyoxymethylene and of 1,646.2 g. of a solution having the following composition:

| | Percent |
|---|---|
| $HClO_4$ | 9.8 |
| $CH_3OH$ | 13 |
| Formaldehyde | 35 | are introduced into a reactor having a capacity of about 2 liters, provided with an agitator and immersed in a thermostatic bath at 35° C.

The starting polyoxymethylene used in this experiment has the following characteristics:

| | |
|---|---|
| $\eta_{red}$ | 0.75 |
| Crystalline orthorhombic form, measured by X-ray examination _____percent__ | 75 |
| Residual fraction resulting from the thermal at 220° C. under vacuum with $Na_2CO_3$ | 0 |

To the suspension having the above composition the following ingredients are added every hour (after having withdrawn the same amount of the suspension by weight):

| | G. |
|---|---|
| Aqueous $CH_2O$ solution 60% (by weight) | 4.68 |
| Aqueous $HClO_4$ solution 70% (by weight) | 0.68 |
| Methanol with a purity ≅99% (by weight) | 0.64 |

From the reactor about 144 g. of suspension are discharged every 24 hours. From this suspension, after filtration, washing and drying, about 24 g. of polymer are obtained. The experiment is stopped after 40 days. The amount of polymer obtained every day is practically constant. From about the 30th day onwards the polymer had almost constant characteristics, more particularly:

| | |
|---|---|
| $\eta_{red}$ | 0.45 |
| Percent crystalline orthorhombic form | >90 |
| Residual dietherified fraction resulting from the thermal treatment at 20° C. with $Na_2CO_3$ _____percent__ | 40–50 |
| The residual dietherified fraction has a $K_d^{200}$ | <0.1 |

EXAMPLE 38

2 kg. of a suspension consisting of 429.4 g. of polyoxymethylene and of 1,570.6 g. of a solution having the following composition:

| | Percent |
|---|---|
| HCl | 7.2 |
| $CH_3OH$ | 6.5 |
| $CH_2O$ | 33 | are introduced into a reactor having a capacity of about 2 liters provided with an agitator and immersed in a thermostatic bath at 35° C.

The starting polyoxymethylene used in this experiment has the following composition:

| | |
|---|---|
| $\eta_{red}$ | 7.5 |
| Crystalline orthorhombic form measured by X-ray examination _____percent__ | 75 |
| Residual fraction resulting from the thermal treatment at 220° C. under vacuum with $Na_2CO_3$ | 0 |

To the suspension having the above composition the following ingredients are added every hour (after having withdrawn the same amount of the suspension by weight):

| | G. |
|---|---|
| Aqueous $CH_2O$ solution, 60% (by weight) | 15.8 |
| Aqueous HCl solution, 35% (by weight) | 3.23 |
| Methanol having a purity ≅99% by weight | 1.02 |

From the reactor about 460 g. of suspension are discharged every 24 hours. From this suspension, after filtration, washing and drying, about 100 g. of polymer are obtained. The experiment is stopped after 33 days. The amount of polymer obtained every day is practically constant. After about 13 days the polymer had almost constant characteristics, more particularly

| | |
|---|---|
| $\eta_{red}$ | 0.40 |
| Percent crystalline orthorhombic form | >85 |
| Residential dietherified fraction resulting from the thermal treatment at 220° C. under vacuum with $Na_2CO_3$ _____percent__ | 30–40 |
| The residual dietherified fraction has a $K_d^{200}$ | <0.1 |

EXAMPLE 39

2.780 kg. of a suspension consisting of 695 g. of polyoxymethylene (having $\eta_{red}=0.55$ and orthorhombic crystallinity of 85% determined by X-ray examination) and a solution having the following characteristics:

| | G. |
|---|---|
| $H_2SO_4$ | 229.5 |
| $C_2H_5OH$ | 146.0 |
| $CH_2O$ | 646.5 |
| $H_2O$ | 1,063.0 | are introduced into a reactor having a capacity of 3 liters, provided with an agitator and immersed in a thermostatic bath at 35° C.

To the suspension having the above composition the following ingredients are added every 2 hours (after having withdrawn the same amount of the suspension by weight).

| | G. |
|---|---|
| Aqueous $CH_2O$ solution, 56.2% (by weight) | 66.84 |
| Aqueous $H_2SO_4$ solution, 96% (by weight) | 6.70 |
| Ethanol, 95% (by weight) | 4.30 |

From the reactor about 934 g. of suspension are discharged every 24 hours. From this suspension, after filtration, washing and drying, about 233.5 g. of polymer are obtained. The experiment is stopped every 20 days. The amount of polymer obtained every day is practically constant. The product subjected to a treatment with a 2% sodium carbonate solution for 2 hours at 100° C. loses 50% of its weight. The successive treatment of melting at 220° C. under vacuum for 15–20 minutes causes a further loss of 25%, referred to the initial weight.

The characteristics of the residual product are:

| | |
|---|---|
| $\eta_{red}$ | 0.50 |
| $K_d^{200}$ | <0.1 |

EXAMPLE 40

2 kg. of a suspension consisting of 308.4 g. of polyoxymethylene and of 1,691.6 of a solution having the following composition:

| | Percent |
|---|---|
| $H_2SO_4$ | 9.5 |
| $CH_3CH_2CH_2OH$ | 6 |
| Formaldehyde | 33 | are introduced into a reactor having a capacity of about 2 liters, provided with an agitator and immersed in a thermostatic bath at 35° C.

The starting polyoxymethylene used in this experiment has the following characteristics:

| | |
|---|---|
| $\eta_{red}$ | 0.59 |
| Crystalline orthorhombic form _____percent__ | 68 |
| Residual fraction resulting from the thermal treatment at 220° C. under vacuum with $Na_2CO_3$ | 0 |

To the suspension having the above composition the following ingredients are added every hour (after having withdrawn the same amount of the suspension by weight):

| | G. |
|---|---|
| 50% (by weight) aqueous $CH_2O$ solution | 10.4 |
| 96% (by weight) aqueous $H_2SO_4$ solution | 1.01 |
| Normal propanol with a purity of 98% by weight | 0.62 |

From the reactor about 288 g. of suspension are discharged every 24 hours. From this suspension, after filtration, washing and drying, about 44 g. of polymer are obtained. The experiment is stopped after 28 days. The amount of polymer obtained every day is practically constant. After 15 days the polymer had almost constant characteristics, more particularly:

$\eta_{red}$ ---------------------------------- 0.40
Percent crystalline orthorhombic form --------- 75
Residual dietherified fraction (resulting from the
  treatment at 220° C. with $Na_2CO_3$) __percent__ 10–20
$K_d^{200}$ of the residual dietherified fraction ------- <0.1

EXAMPLE 41

2 kg. of a suspension consisting of 357.4 g. of polyoxymethylene and 1,642.6 of a solution having the following composition:

| | Percent |
|---|---|
| $H_2SO_4$ | 9.5 |
| $CH_3CH_2CH_2CH_2OH$ | 6 |
| Formaldehyde | 31 | are introduced into a reactor having a capacity of about 2 liters, provided with an agitator and immersed in a thermostatic bath at 35° C.

The starting polyoxymethylene used in this experiment has the following characteristics:

$\eta_{red}$ ---------------------------------- 0.59
Crystalline orthorhombic form _____percent____ 68
Residual fraction resulting from the thermal treatment at 220° C. under vacuum with $Na_2CO_3$ ___ 0

To the suspension having the above composition the following ingredients are added every hour (after having withdrawn the same amount of the suspension by weight):

| | G. |
|---|---|
| 50% (by weight) aqueous $CH_2O$ solution | 10.4 |
| 96% (by weight) aqueous $H_2SO_4$ solution | 0.97 |
| Normal butanol with a purity of 99% by weight | 0.59 |

From the reactor about 287 g. of suspension are discharged every 24 hours. From this suspension, after filtration, washing and drying, about 51.4 g. of polymer are obtained. The experiment is stopped after 28 days. The amount of polymer obtained every day is practically constant. After about 15 days the polymer has almost constant characteristics, more particularly:

$\eta_{red}$ ---------------------------------- 0.38
Percent crystalline orthorhombic form, measured
  by X-ray examination _____percent__ >50
Residual dietherified fraction resulting from the thermal treatment at 220° C. with $Na_2CO_3$
                                         percent__ 5–15
$K_d^{200}$ of the residual dietherified fraction ------- <0.1

While the present invention has been described with respect to specific examples, it is to be understood that these examples are for purposes of illustration, and that the invention is not limited thereto, since many variations and modifications can be practiced without departing from its spirit and scope.

Having described the invention, what it is desired to secure and claim by Letters Patent is:

1. A process for the preparation of high polymers of formaldehyde having a high thermal stability which comprises reacting at a temperature of from 0° to 60° C. a suspension of a solid polyoxymethylene and an aqueous formaldehyde solution having a $CH_2O$ concentration between the equilibrium concentration and the stability limit of the system, in the presence of from 0.5% to 31%, based on the weight of said solution, of one or more acids selected from the group consisting of the strong acids, each of said strong acids being an inorganic or organic acid having one or more acidic hydrogens, wherein each of said acidic hydrogens has a pKa less than 2.

2. The process of claim 1, wherein the reaction temperature is from 20° to 40° C.

3. The process of claim 1, wherein the polymerization of formaldehyde is carried out in the presence of one or more aliphatic alcohols having 1–5 carbon atoms, the concentration of which in the liquid phase is kept at a value lower than 25% by weight of the solution.

4. The process of claim 3, wherein methanol is used as the alcohol.

5. The process of claim 4, wherein there is added to the reaction system a salt, having a neutral reaction in water, of an inorganic base with a strong inorganic or organic acid having one or more acidic hydrogens, each of said acidic hydrogens having a pKa less than 2, the concentration in the system of said salt being kept at a value lower than or equal to the saturation concentration of the salt in the solution.

6. The process of claim 1, wherein the solid product is subsequently separated from the reaction system and heated with sodium carbonate at a temperature from about 100° to 220° C.

References Cited

UNITED STATES PATENTS

| 3,000,860 | 9/1961 | Brown et al. | 260—67 |
| 3,000,861 | 9/1961 | Brown et al. | 260—67 |
| 3,340,234 | 9/1967 | Brown et al. | 260—67 |
| 3,027,352 | 3/1962 | Walling et al. | 260—67 |

OTHER REFERENCES

Geil et al.: Growth and Perfection of Crystals, edited by Doremus, Roberts and Turnbull, John Wiley & Sons, Inc., New York (1958), pp. 579–585.

WILLIAM H. SHORT, *Primary Examiner.*

L. M. PHYNES, *Assistant Examiner.*

UNITED STATES PATENT OFFICE
CERTIFICATE OF CORRECTION

Patent No. 3,425,991                                             February 4, 1969

Luigi Mortillaro et al.

It is certified that error appears in the above identified patent and that said Letters Patent are hereby corrected as shown below:

Column 1, TABLE 1, heading to the third column, line 1 thereof, "η Red" should read -- $\eta_{Red}$ --. Column 2, line 57, "polyoxymethylene" should read -- polyoxymethylenes --; same column 2, TABLE 4, second column, insert as the heading -- $\eta_{red}$ of the polymer obtained --. Column 3, line 15, "allows for a" should read -- allows a --; line 23, before "using" insert -- by --; TABLE 5, fifth column, line 2 thereof, "∼50" should read -- ≃50 --; same column 3, line 50, "CH$_3$OC" should read -- CH$_3$OH --. Column 4, line 14, "cascades" should read -- cascade --. Column 5, line 21, "60° C. under" should read -- 60° C., under --; line 57, "Carazzolo and C." should read -- Carazzolo and G. --. Column 6, line 32, "3 and 12" should read -- 8 and 12 --. Column 7, line 9, "3 kg." should read -- 2 kg. --; line 55, "Crystaline" should read -- Crystalline --. Column 8, line 26, "671.7 G." should read -- 671.7 g. --. Column 9, line 43, "28 kg." should read -- 2 kg. --. Column 11, line 54, "30" should read -- 80 --; line 74, "<0.24" should read -- 0.24 --. Column 14, line 28, "26 days" should read -- 28 days --. Column 15, line 29, "treatment" should read -- treatment at --. Column 16, line 66, "8" should read -- 6 --. Column 17, line 21, "316.6 of" should read -- 316.6 g. of --; line 54, "90" should read -- >90 --; line 67, "20.4" should read -- 20.0 --. Column 18, line 7, "reacteor" should read -- reactor --; line 41, "2.3" should read -- 2.8 --; line 48, "every" should read -- every day --; line 51, cancel "G.". Column 20, line 3, "0.58" should read -- 0.57 --; line 75, ">0.1" should read -- <0.1 --. Column 21, line 7, "CH$_2$OH" should read CH$_3$OH --; line 32, "drying about" should read -- drying, about --; line 39 ">80" should read -- >90 --. Column 21, line 43, " >0.1" should read -- <0.1 --. Column 22, line 11, ">0.1" should read -- <0.1 --; line 42, "suspens after" should read -- suspension, after --. Column 24, line 39, "10.8" should read -- 10.86 --; line 45, "for the" should read -- for this --; line 50, "70" should read -- 76 --. Column 25, line 18, "thermal at" should read -- thermal treatment at --; line 22, "every hour" should read -- every 2 hours --; line 3 "at 20° C." should read -- at 220° C. --; line 63, "every hour" should read -- every 2 hours --; line 71, "460 g." should read -- 480 g. --. Column 26, line 5, "Residential" should read -- Residual --. Column 27, line 48, ">50" should read -- 50 --.

Signed and sealed this 24th day of March 1970.

(SEAL)
Attest:

EDWARD M. FLETCHER, JR.
Attesting Officer

WILLIAM E. SCHUYLER, JR.
                                                            Commissioner of Patents